June 21, 1966 R. BRAVERMAN 3,257,023
CONTAINERS

Filed Feb. 11, 1963 8 Sheets-Sheet 1

INVENTOR.
ROBERT BRAVERMAN
BY

June 21, 1966   R. BRAVERMAN   3,257,023
CONTAINERS
Filed Feb. 11, 1963   8 Sheets-Sheet 2
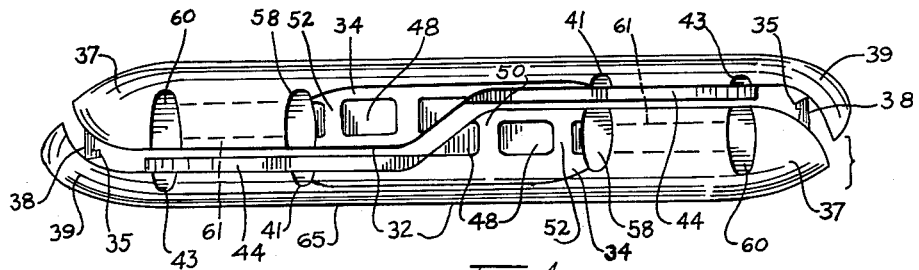
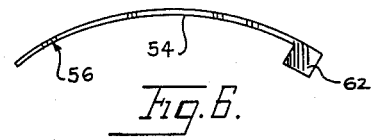
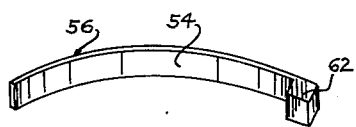
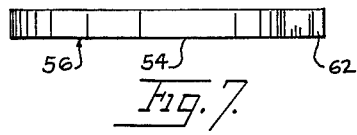
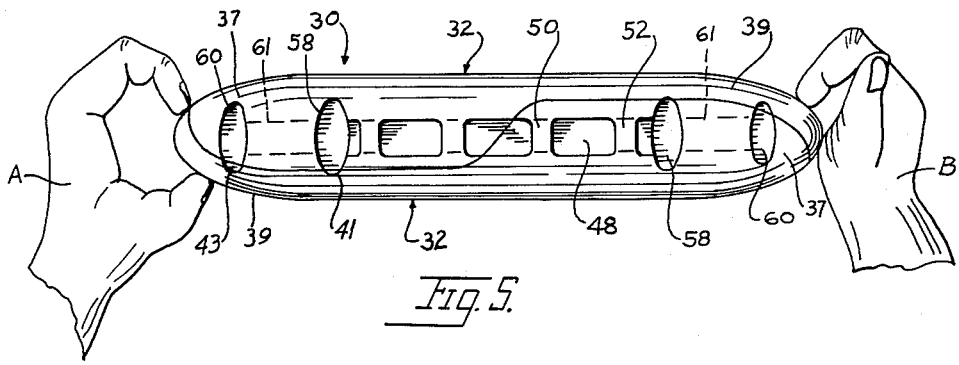
INVENTOR.
ROBERT BRAVERMAN
BY

INVENTOR.
ROBERT BRAVERMAN
BY

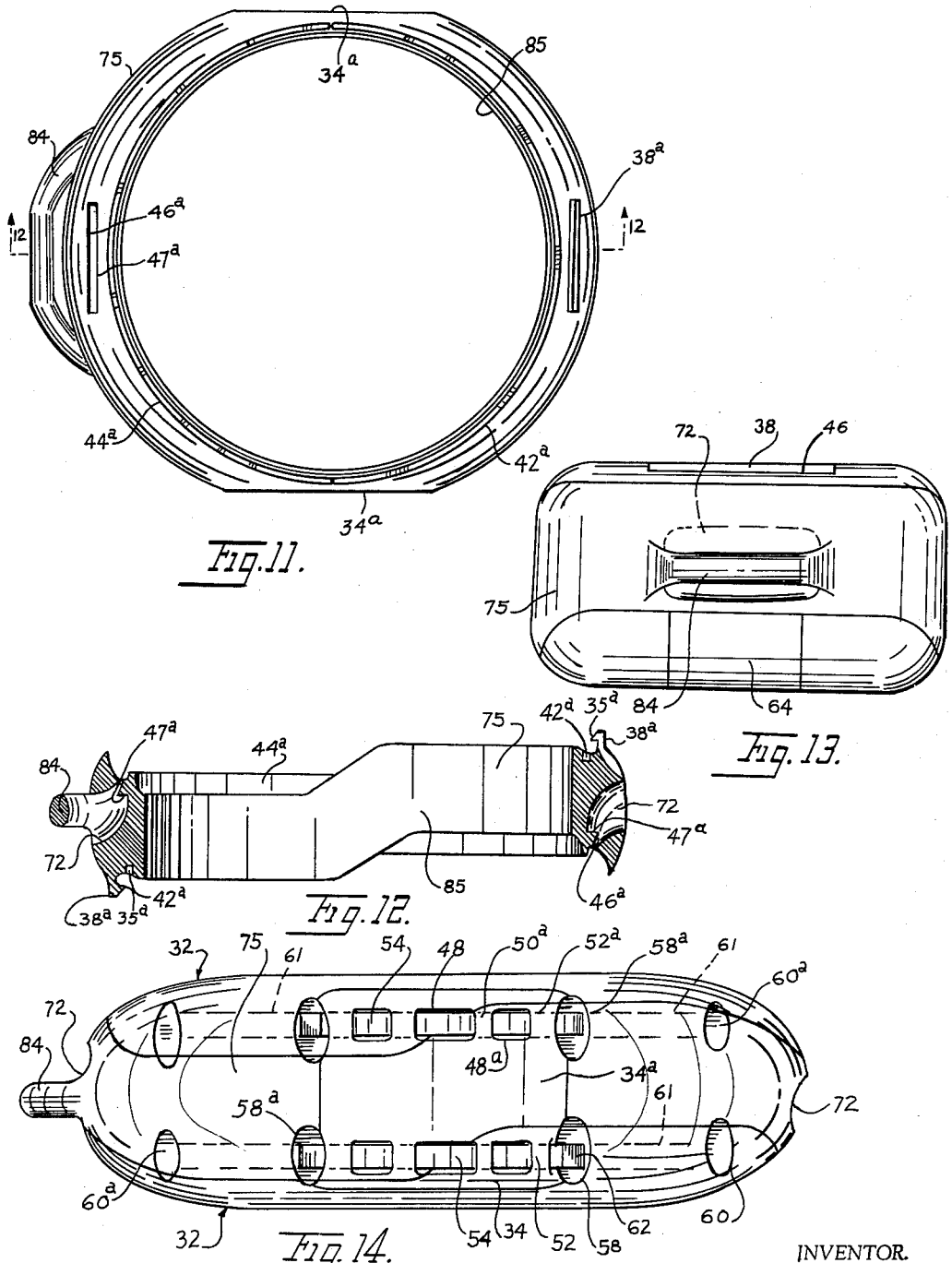

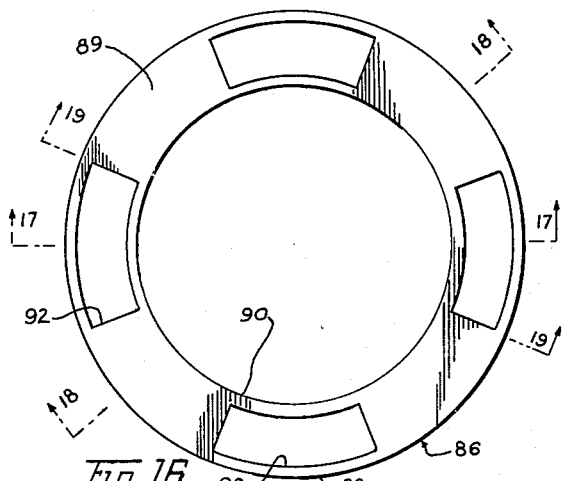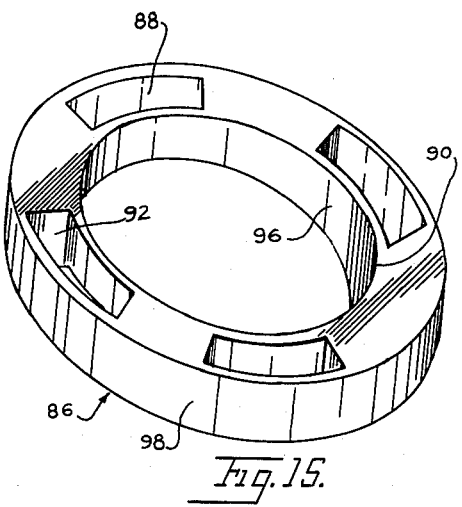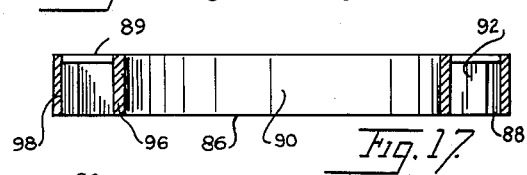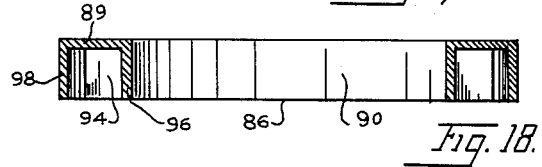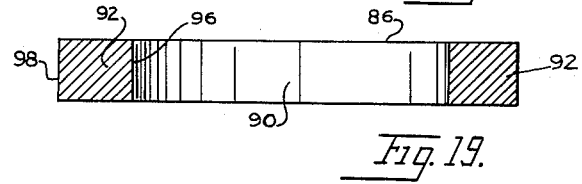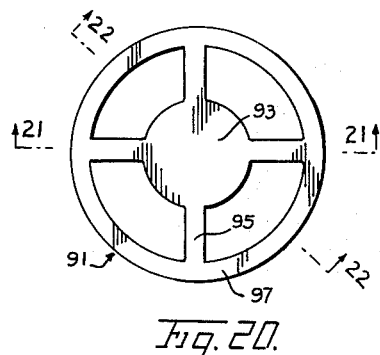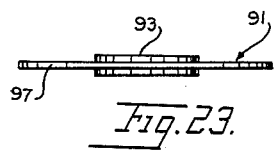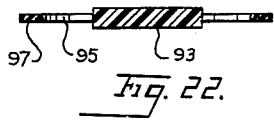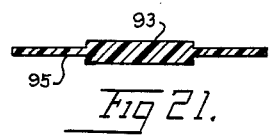

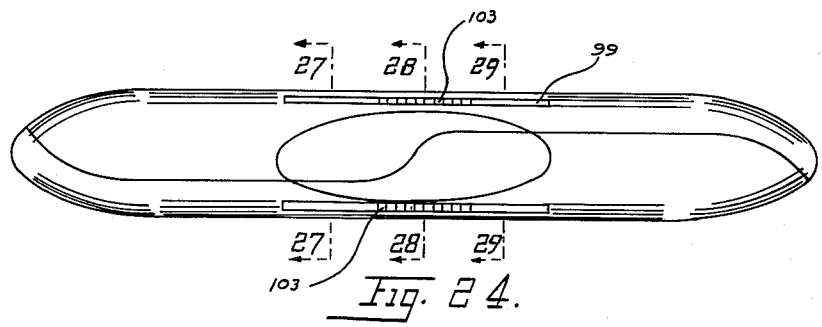
Fig. 24.
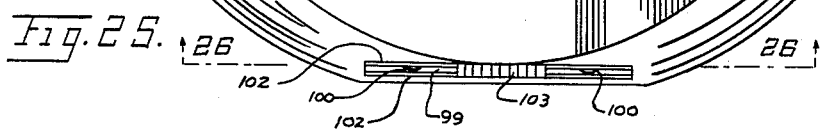
Fig. 25.
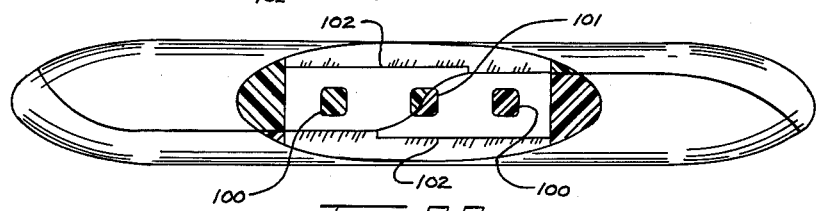
Fig. 26.
INVENTOR.
ROBERT BRAVERMAN
BY

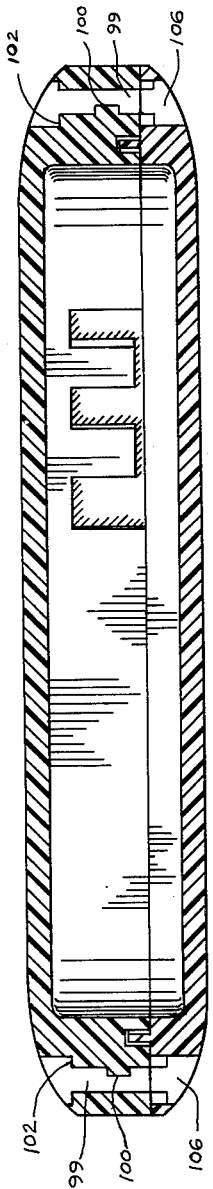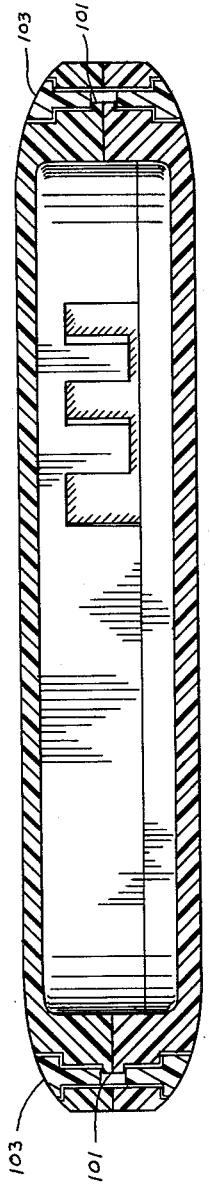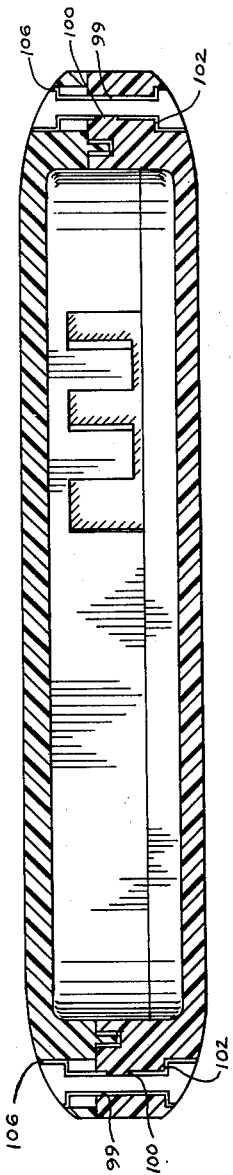

June 21, 1966   R. BRAVERMAN   3,257,023
CONTAINERS

Filed Feb. 11, 1963   8 Sheets-Sheet 8

INVENTOR.
ROBERT BRAVERMAN
BY

United States Patent Office 3,257,023
Patented June 21, 1966

3,257,023
CONTAINERS
Robert Braverman, 69 Marion Ave., Merrick, N.Y.
Filed Feb. 11, 1963, Ser. No. 261,552
2 Claims. (Cl. 220—4)

This application is a continuation-in-part of my copending application, Containers, Serial No. 54,637, filed Sept. 8, 1960, now Patent No. 3,077,281.

This invention relates to the art of shipping and storage containers of general utility.

Various types of containers have catches to hold component units together. These catches, however, usually require the operator to bend, flex, rotate or laterally move various parts of the catch mechanisms, manually and often with tools, in order for the catches to register and/ or engage properly. Moreover, these containers and their closures are such that, during shipment or storage, a single external blow, or pressure from two directions, could release a catch and thereby allow the container to open. This could come about from a two-directional stress as might be encountered from a blow while the unit was on a counter, shelf, floor, etc., as these catches have no means for keeping them or the container closed during such rigors of shipping or storage. Although some containers have stop shoulders or other devices to prevent lateral movement of sections, two-directional pressures as above, could still disengage catches and thereby cause the container to open.

In other containers or casings which are constructed so that their capacity may be increased, the methods of opening the units, of inserting or removing the expansion members, and of closure, are such that these processes cannot be done quickly and easily without the use of tools. For example, one such unit requires nuts and bolts and appropriate tightening tools.

Other containers, and their spacer members or other inserts for limiting the movement of the contents, transmit external blows or stresses to the contents.

Other containers require labels to be affixed to the container with adhesives or tags or have external protruding label-holding frames. Such methods allow labeling information to be lost, marred or defaced easily, and the attachment, insertion or removal of labels is often a difficult process, sometimes requiring tools to pry up parts when a label-holding frame is used. Moreover, such containers allow labeling and other information to be removed or to fall off, even when the container is closed.

The present invention overcomes all the difficulties and disadvantages described, as well as others of conventional shipping and storage containers. According to the invention, there is provided a container made of two dished sections having flat sides. It has no protruding parts. Its method of opening and closing is simple and secure. Expansion inserts may be provided, adapted to interlock with the container sections for expanding the carrying capacity of the sections. Other inserts may be provided for reducing or modifying the shape of the cavity defined by the several sections, and to serve as shock absorbers. One or more inserts can be provided especially formed to serve as spacer members and shock absorbers. The several sections and expansion inserts are provided with snap-locking clamps and may be held together with supplementary internal locking slides. The dished sections are of a dome-like structure and the container's external surface is primarily curved, to achieve greater strength and to reduce the transmission of external blows to the contents of the container. The two dished sections together, and the curvature, form a secure means of holding address or information cards on their exterior.

As in the previous application, the improvements herein related have, as one object, to provide an improved container of general utility, for shipment and storage of articles and materials.

Further objects of the invention are: to provide a container having a closure which when closed is secure so that accidental blows, dropping, external pressures, etc., do not cause undesired opening of the container; to provide a container which may serve as a substantially airtight, moisture-proof, insect-proof storage means; to provide a container having a body strong enough to avoid breakage and deformation under the weight of other packages and other stresses, strains and blows normally encountered during shipment and storage; to provide a container which will transmit a minimum of external stresses, blows, etc. to its contents; to provide a container having a closure means which is simply, easily and effectively operated during the processes of opening and closing the container without requiring adhesives, cards, tools or other such closure aids; to provide a container having a closure means which cannot be opened by accidental blows during normal shipping conditions; to provide means in a container for attaching and removing identification and information or other labels without the use of adhesives, staples, tools, etc., and in such manner that the labels are not normally removable without opening the container; to provide a container which lies flat without rolling or tipping; to provide a container without protruding parts which might scratch or catch other articles, containers or furniture and other surfaces with which it may come in contact, and which might injure persons handling the container; to provide a container which is light in weight; to provide a container which when closed prevents its contents from excessive vibration and movement; to provide a container with means for quickly and easily increasing or decreasing its carrying capacity by use of suitable inserts; to provide means for attaching a carrying handle to a container when required.

Still further objects of the invention are: to provide means for preventing shock and damage between articles when more than one thereof is carried in the container; to provide a container which could be made of two interchangeable halves or sections which can be produced by mass production methods at low cost; to provide a re-usable container so that it can be used for repeated shipments and storage over many years.

According to the invention, the container is useful in shipping and storage of such things among others as motion picture film, recording tape, phonograph records, precision instruments, etc.

For further comprehension of the invention, and of the objects and advantages thereof, reference will be had to the following description and accompanying drawings, and to the description and drawings of the copending application, and to the appended claims in which the various novel features of the invention are more particularly set forth.

In the accompanying drawings forming a material part of this disclosure:

FIG. 4 is an exploded side elevational view of the container showing parts in an unassembled condition.

FIG. 5 is an elevational view similar to FIG. 4 illustrating one method of opening the container.

FIG. 6 is a side view of a fastener member employed with the container.

FIG. 7 is a bottom plan view of the fastener member.

FIG. 8 is a perspective view of the fastener member.

FIG. 11 is a top plan view of an expansion insert for the container.

FIG. 12 is a sectional view taken on line 12—12 of FIG. 11.

FIGS. 13 and 14 are end and side elevational views, respectively, showing the container with the expansion insert in place therein.

FIG. 15 is a perspective view of a space reducing insert for the container.

FIG. 16 is a top plan view of the space reducing insert.

FIGS. 17, 18 and 19 are sectional views taken on lines 17—17, 18—18 and 19—19, respectively, of FIG. 16.

FIG. 20 is a top plan view of a shock-reducing insert for the container.

FIGS. 21 and 22 are sectional views taken on lines 21—21 and 22—22 of FIG. 20.

FIG. 23 is a side elevational view of the shock-reducing insert.

FIG. 24 is a side elevational view of a container in closed condition embodying additional aspects of the invention.

FIG. 25 is a plan view of the container portrayed in FIG. 24.

FIG. 26 is a sectional view taken on line 26—26 of FIG. 25.

FIG. 27 is a sectional view taken perpendicularly to line 27—27 of FIG. 24.

FIG. 28 is a sectional view taken perpendicularly to line 28—28 of FIG. 24.

FIG. 29 is a sectional view taken perpendicularly to line 29—29 of FIG. 24.

Figures 30, 31, 32:
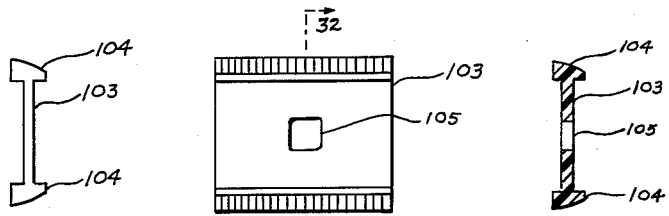

FIG. 30 is an end view of the locking slide.

FIG. 31 is a side elevational view of the slide.

FIG. 32 is a sectional view taken on line 32—32 of FIG. 31.

Figure 33:
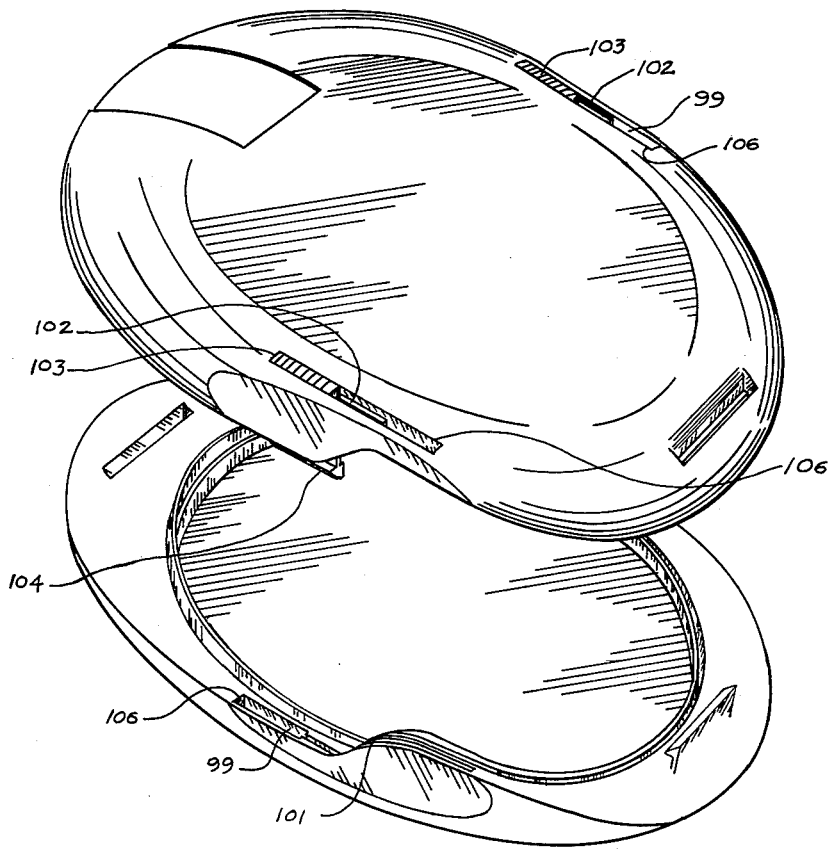

FIG. 33 is an exploded top perspective view of an open container with its slides being retained in open positions.

Referring to the drawings, there is shown in FIGS. 1–5 a sectional container 30 made in accordance with several aspects of the invention. The container comprises two sections 32 formed of plastic material. Each section is dish-shaped and comprises a flat body 31 substantially circular in plan, the flat body merging gracefully into a curved peripheral flange 33. The flange at one side of the body is enlarged and raised as indicated at 37 to provide a wall encircling substantially half said body and at the opposite side 39 is thinned or reduced. Between the enlarged side portion 37 and the thin side 39 the flange is cut away to form opposed flat sides 34. The flat sides 34 are on both sides of the body 31. The face of the enlarged portion 37 of the flange 33 is formed with an outwardly projecting elongated ridge 38 formed with a bevelled hook 35 on its outer end. The ridge 38 may be reinforced by a metal strip 40. The ridges 38 with the hooks 35 serve as catches and will hereinafter be called "catches." An arcuate groove 42 is also formed in the face of the enlarged portion 37 inwardly of the ridge 38. The opposite thin side 39 is formed with an outwardly projecting arcuate ridge 44 of the same shape as the groove 42 and adapted to fit into the groove 42 of the mating section. The thin portion 39 is formed with an opening 46, the inner wall of the opening having a flared wall terminating at its inner end in a bevelled ledge 47 shaped to receive and interlock with the hook 35 of the ridge 38 of the catch of the mating section.

Figure 1:
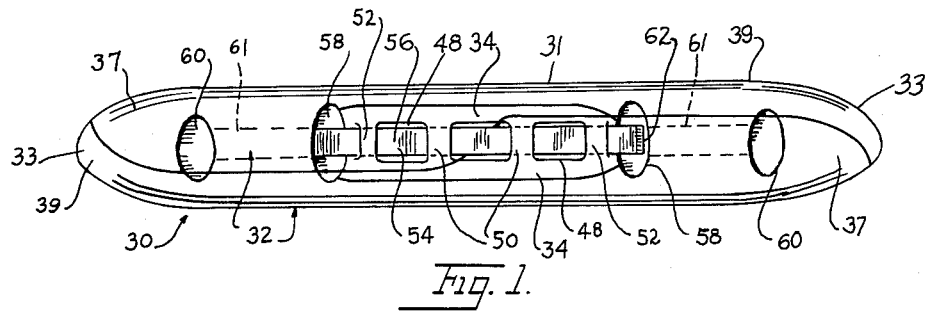
FIG. 1 is a side elevational view of a container in closed condition embodying several aspects of the invention.
Figure 2:
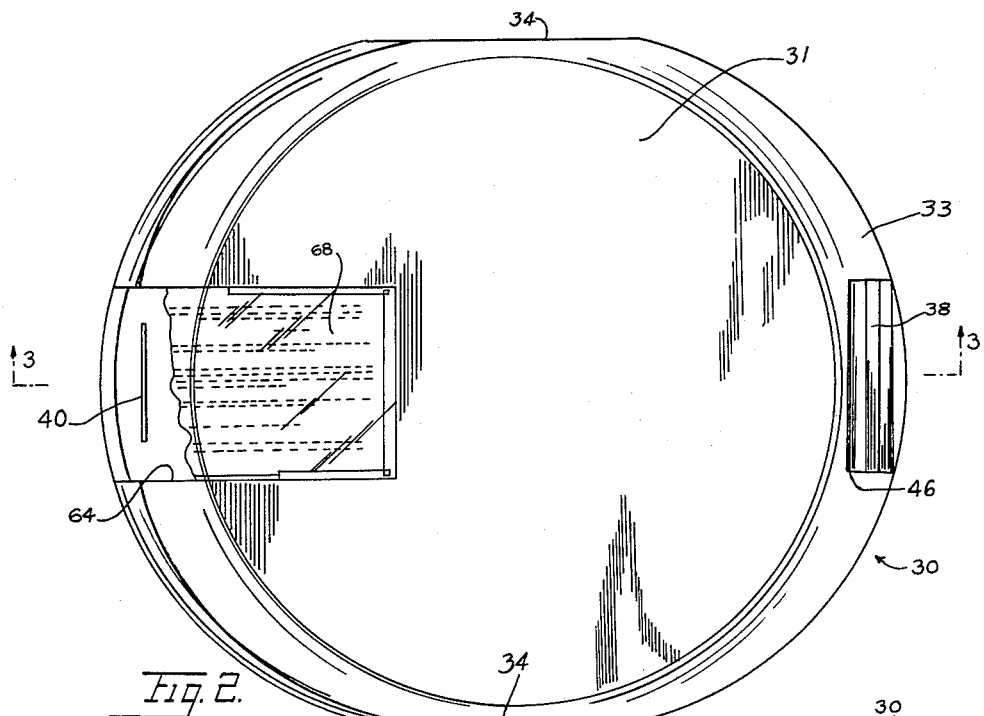
FIG. 2 is a plan view of the container.

The flat sides 34 are each formed with an elongated passage or tunnel 48 extending therealong, and disposed across the passage at spaced intervals are straps 50 and 52 adapted to slidably receive and retain the bowed spring body portion 54 of a fastener member 56 shown to best advantage in FIGS. 6, 7 and 8. Each elongated passage or tunnel 48 terminates in an oval-shaped recess 58, one end of the recess 58 intersecting the face of the flange of the section 32. Another oval-shaped recess 60 is also formed in the enlarged portion 37 of the flange of the section 32 outwardly of the flat side 34, one end of the recess 60 intersecting the face of the flange of the section. An inner passage 61 is formed in the enlarged portion 37 extending from the recess 60 to and intersecting the inner edge of the enlarged portion to slidably receive the fastener member 56. On the opposite thin side 39 of the section, inner and outer notches 41 and 43 are formed along the edge of the flange and adapted to register with the ends of the inner and outer recesses 58 and 60, respectively, of the mating section. The inner recess 58 is adapted to receive and retain the head 62 of the fastener member 56 when the fastener member is fully inserted through the guideway defined by the passage 48 and loops 50, 52 so that the sections 32 of the container are held closed as shown in FIG. 1. When the fastener member 56 is retracted from its fastening position for separating the sections and opening the container, it may be inserted through the recess 60 into and through the passage 48 formed in the enlarged portion 37 of the section for storage purpose, the recess 60 accommodating the head 62 of the fastener member.

The sections when locked to each other provide a cavity or compartment 70 therebetween which is substantially air-tight and moisture-proof.

Figure 9:
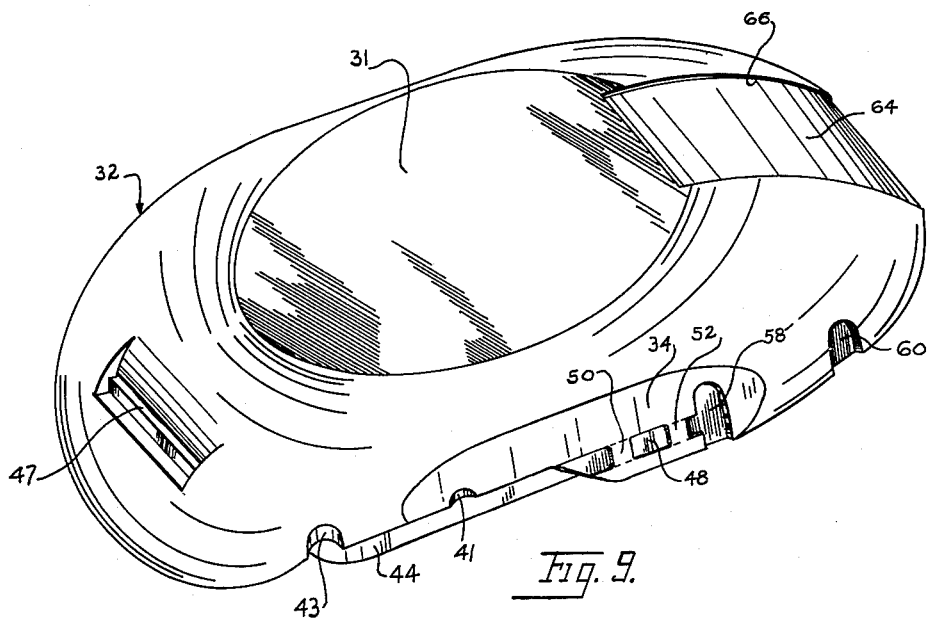
FIG. 9 is a top perspective view of one of the sections of the container, showing the exterior of the section.
Figure 10:
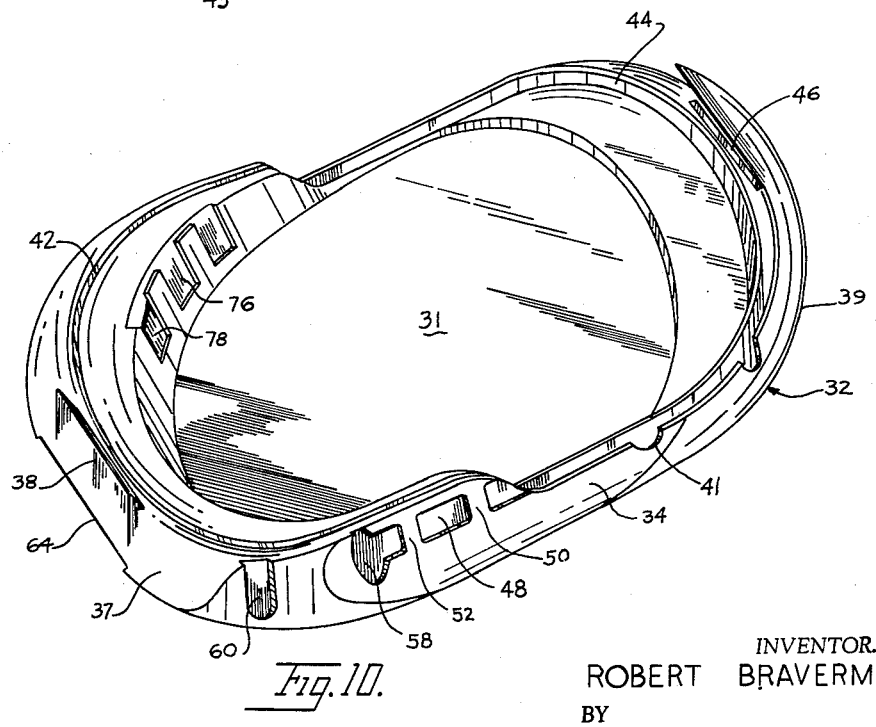
FIG. 10 is a bottom perspective view of the section shown in FIG. 9.

Referring to FIGS. 9 and 10, it will be noted that the sides of each section 32 are formed with the ridges or tongues 44 to engage in the grooves 42 of the mating section. The inner surface of the flange portion of the body of each section at the enlarged or thicker side 37 thereof is formed with recesses 76 with undercut side walls to receive inserts such as blotting paper strips 78 which may be moistened to provide a humid interior in the container. Inserts 78 may contain insecticides, perfume or other agents for conditioning the contents of the container as desired.

FIGS. 11–14 show an insert 75 which may be used as an expansion member to increase the carrying capacity of the container. This insert is a generally annular or ring-shaped member with one half of the member offset from the plane of the other half of the member. Elongated ridges 38$^a$ with hooks 35$^a$ are provided on opposite sides of the member 75 extending outwardly in opposite directions. These ridge members and hooks are similar to the catches of the sections 32. Slots 46$^a$ provided with ledges 47$^a$ are provided similar to the slots 46 and ledges 47 of sections 32. Ridges 44$^a$ and grooves 42$^a$ correspond to ridges 44 and grooves 42 of the sections 32. Recesses 72 may be provided on opposite sides of the insert to provide access to the ridges 38$^a$ to open the container.

A loop handle 84 may be provided on one side of the member 75. The inner periphery 85 of member 75 registers with the inner peripheries of sections 32 to form an enlarged cavity in the container when the insert is assembled with the two sections 32 as shown in FIGS. 13 and 14. The insert 75 has opposed flattened sides 34$^a$ registered with the opposed flattened sides 34 of sections 32 and further has an elongated passage or tunnel 48$^a$ extending therealong and disposed across the tunnel are spaced loops 50$^a$ and 52$^a$, all corresponding to similar passage and loop portions on the sections 32. Thus, two strap fasteners 54 may be employed to lock the sections 32 and the insert 75 together in one unitary assembly as shown in FIGS. 13 and 14.

FIGS. 15–19 show an annular member or ring 86 which may be used as a capacity reduction and shock absorbing insert to be disposed in the hollow interior of the container 30 for adapting it to carry smaller articles without danger of vibration or excess movement. This ring has a hollow shell-like body with a top wall 89, being open at the bottom as viewed in FIG. 15, and is provided with spaced arcuate-shaped openings 88 defined by the inner peripheral wall 92, outer peripheral wall 98 and transverse walls 92.

FIGS. 20–23 illustrate another form of insert in the form of a plastic ring member 91 having a thick central disc-shaped body 93 and a thinner outer annular rim 97 joined by radial spokes 95. The insert may be placed between a pair of reels of photographic film or magnetic recording film in the cavity 70 of the container 30 to serve as a shock absorber and spacer member therefor.

In order to close the container 30, the two superimposed sections 32 are clamped together by the semirigid catches 38 which snap into place and engage on the ledges 47 in the slots 46 of the mating sections. Two strap fastener members 56 should be inserted in the passages 48 on both sides of the two sections 32. The heads 62 of the fastener members should be seated in the recesses 58. The normally arcuate fastener members will be under tension due to their being held in substantially straight positions so that the heads of 62 cannot slip out of the recesses 58. The passages or tunnels 48 on both sides of the sections 32 supplement each other as the fastener members 56 extend across the joint from one section to the other.

To open the container, the strap or belt fastener members 56 should be grasped at their head ends 62 and completely withdrawn from the tunnels 48 and then reinserted into the recess 60 and tunnels 61 and 48. The body portion 54 of each fastener member 56 will now be clear of the other section 32. The fastener members will be held securely and safely until again needed to lock the sections together. The catches 38 may then be pressed outwardly to clear the ledges 47 somewhat in the manner shown in FIG. 5. This can be done by engaging a thumb on a catch 38 as illustrated by hand A in FIG. 5 while the fingers of that hand engage in the recess 64a and press in opposite directions. By retracting the one catch and pushing it outwardly past the ledge 47 in the slot 46 the sections 32 are disengaged. Hand B illustrates another way of opening the clamp. The fingers of hand B engage the catch 38 and retract it while the heel of the hand presses on the narrow or thin side of the section. If desired, the actions described can be performed by both hands A and B simultaneously to release the sections.

To expand the carrying capacity of the container and provide a carrying handle, one or more expansion inserts 75 can be inserted between any two outer sections 32. The inserts all have mating catches 38a, slots 46a, ridges 42a and grooves 44a so that a unitary structure can be made. The locking fastener members 56 can be inserted between each pair of adjoining members to insure safe and secure locking of the several members together.

To reduce the capacity of a container, one or more of the annular reducing inserts 86 can be inserted in the hollow compartment or cavity 70 of the container, or in the expanded cavity obtained when one or more inserts 75 are used.

To provide a shock absorbing means between several articles such as tape reels, the inserts 91 can be used. If humidifiers or dehumidifiers are required, then suitable conditioning elements can be inserted in the grooves or recesses 76, such as wet or dry blotting paper 78.

A modification of the invention is shown in FIGS. 24 to 33. There is shown in FIGS. 24–25 slides 103 in slots 99. Slot 99 is a keyway, or tunnelled channel running vertically through the enlarged portion of each of the container's two sections, in the proximity of the two flat sides. As shown in FIGS. 25–27 and 29, into each slot 99, there projects outwardly from the innermost face of each slot 99 a cylinder section, projection 100. This projection may be approximately one half of a cylinder. From the same face, there projects outwardly a split projection 101 which is similar to half a cylinder section projection 100, if projection 100 were cut diagonally in half. Split projection 101's location within slot 99 is at the center of each section's diagonal flat edge.

When the two sections of the container are assembled, the split projection 101 of one section meets the split projection 101 of the other section to form the equivalent of projection 100.

As shown in FIGS. 27–29, slot 99 is wider where it meets the exterior surface of the closed container. Within this wider area is ridge 102, running the length of slot 99, as shown in FIGS. 26 and 27. As shown in FIGS. 27, 29 and 33 there is a wider slot 106, connected to and adjacent to each slot 99. Wider slots 106 run vertically through the thin portions of each section of the container, in the proximity of each of the two flat edges, supplementing slot 99.

Although the connected slots 99 and 106 are here shown positioned in a straight line, they might also be formed so as to describe a curve, vertically or horizontally, or offset to form a displacement in the channel formed, or be shaped irregularly, or in some other continuous arrangement.

Slide 103, as shown in FIGS. 30–32, operates within the channel formed by slot 99 and wider slot 106. The two flanged heads 104 of slide 103 are wider than the slide's center section, and complement the shape of ridge 102 and follow the curvature of the exterior surface of the container, so that there is no external protrusion of the slide's heads beyond the container's surface. The external surfaces of the ends of heads 104 may be rough textured or ribbed to facilitate the operation of the slides. At the center of slide 103, there is a hole or recession 105 which conforms to the shape of projection 100, but is the reverse of it so that projection 100 can be fitted into hole or recession 105. Slide 103's height from the end of one head 104 to the end of the other head 104 is approximately equal to the height of slot 99 plus the height of water slot 106. The length of slide 103 is slightly less than the length of wider slot 106, thereby making it possible for slide 103 to be inserted into wider slot 106 and to pass through it completely, when the container is open, as wider slot 106 contains no ridges. As all cross-sections of slide 103 along its length are the same, except for hole or recession 105, one way of producing slide 103 economically would be by extrusion of material, such as plastic, through a die opening corresponding to slide 103's end section, cutting the extruded material to proper lengths, and stamping hole or recession 105. Although slide 103 is shown here as being straight along its length, it could be curved or irregular or of whatever shape necessary to conform to the shape selected for the channel formed by slot 99 and wider slot 106.

Prior to the initial closing of the container, two slides 103 are inserted into any two wider slots 106 of a pair of sections. One slide 103 is inserted into each of the two selected wider slots 106 in the following manner: Either head 104 of slide 103 may be inserted into wider slot 106, with slide 103 directionally oriented so that the sloped ends of heads 104 conform to the sloping exterior contours of the sections. Slide 103 may be inserted into wider slot 106 from the top or bottom of wider slot 106. Slide 103 is inserted to a depth whereby the end of a head 104 is flush with the exterior surface of the section.

Maintaining this orientation, slide 103 is moved and forced as far as is possible into slot 99. In this process, the following events occur: The edge of slide 103 collides with split-projection 101. However, because of the curved surface of this cylindrical section, the edge of slide 103 rides over the split-projection 101 into slot 99, with the head 104, which was in wider slot 106, passing onto ridge 102. As slide 103 is thicker than slot 99 at the place where split-projection 101 protrudes into slot 99, slide 103 forces the semi-rigid flexible material of which the container is constructed, such as plastic, to flex outwardly of slot 99. During the continued movement of slide 103, split-projection 101 at one time engages in hole or recession 105. As split-projection 101 is a section of a cylinder, the hole or recession 105 and the remainder of slide 103 pass over the curved surface of split-projection 101, while the container's flat edge again flexes outwardly. The edge of slide 103 then collides with projection 100, rides over projection 100 because of the cylindrical surface and the container edge's ability to flex. When hole or recession 105 embraces projection 100, the semi-rigid container edge flexes back to its normal position pressing and holding slide 103 securely around projection 100. Because the flat top and bottom of the cylindrical section of projection 100 are held against the corresponding straight interior top and bottom edges of hole or recession 105, there is no rotation of slide 103 on projection 100 in slot 99. This construction allows for quick assembly of the slides in the container sections.

When slide 103 is engaged on projection 100, it is in the "open" position. FIG. 33 shows two slides 103 in the open position of an open container. In this portrayal, both slides 103 are shown in the two slots 99 of the same section. Both slides 103 might just as well be in the other section's slots 99; or one slide 103 might be in one section and the other slide 103 might be in the other section, providing that they were both not in opposing slots.

Figure 3:
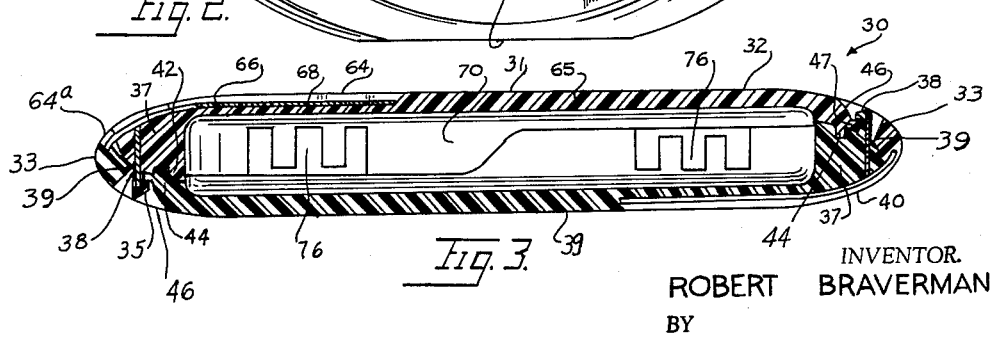
FIG. 3 is a sectional view taken on line 3—3 of FIG. 2.

FIGS. 3, 9 and 10 of the drawings show the container sections in detail, except for the mechanism described above and shown in FIGS. 24–33. Referring to all of these drawings, the method of assembling and closing the container is as follows: Two sections 32 are placed in generally superimposed position and then pressed together. As the containers are brought together, arcuate ridges or tongues 44 engage in the arcuate grooves 42 of the mating section, thereby registering both sections properly in relation to each other, and in so doing, properly positioning the catches with their opposing openings and the slides with their opposing slots. When the two sections are brought together in approximately the correct relationship, the pressing action tends to move the sections against each other in such a manner that the ridges and grooves guide the sections into correct positioning. Those heads 104, projecting from slots 99 rather than retained in slots 99, pass through the opposing wider slots 106 of the mating section, as the catches consisting of bevelled hooks 35 of ridges 38 snap over and into inter-locking relation with bevelled ledges 47, and ridges 44 completely enter grooves 42.

This action of the catches occurs instantly and automatically because of the bevelled top of hook 35 and the outwardly flared wall of opening 46. As can be seen in FIG. 3, the end of hook 35 would collide with ledge 47 as the catch entered opening 46. As the catch is semi-rigid, but can flex, the pressing of the sections together forces the catch to flex. The catch's flexing is directed outwardly, because the flared opening makes it possible for the catch to bend back by providing space for the catch to move back into, and because the ridge 38, pressed and bearing against the slope of the bevelled edge of hook 35, forces the hook to flex in the desired direction only, because of the hook's bevelled edge. This press-closure is rapid and simple, requiring no manipulation by the operator other than the simple bringing together of the two sections. There is no manual flexing, rotating or lateral movement required.

At this time, the two split-projections 101 of one section are against the two split-projections 101 of the mating section. Each slide 103 is now moved off projection 100 and onto the adjacent split-projections 101 until the split-projections are engaged in hole or recession 105. As projection 100 is a cylindrical section, and as the split-projections 101 combined form the equivalent of projection 100, and as the flat sides of the container flex, slides 103 can move on and off the curved structure of the projections. Ridge 102 guides slide 103 in its movement, and the pressure of the container's material holds slide 103 securely against the projections. As the hole or recession 105 defines the mating shape of the two adjacent split-projections 101, and as the top and bottom edges of the projection and the hole are flat and straight respectively, there is no rotation of slide 103 around the projections. When slide 103 is engaged on the two adjacent split-projections, the slide is said to be in the "locked" position. When the slides 103 are in the locked position, any blows to or flexing of or other action of the spring catch mechanism of hooks 35 of ridges 38 will not allow the container to open.

To open the container, each slide 103 must first be moved forward or back onto projection 100 of either section of the container. Hooks 35 of ridges 38 may then be disengaged from ledges 47, each catch passing through an opening 46, as one head 104 of each slide 105 slips out of the wider slot 106 of the mating section. The slides 105 are retained in the sections in the open position.

In the above manner, the container may be quickly and easily closed and locked, or unlocked and opened with a minimum of operations, although the container cannot be opened accidentally unless a proper sequence of blows and/or stresses at four points from at least three different directions occurs. The container cannot be opened by disengaging the catches unless the slides are first moved into the open position. Conversely, the slides cannot be moved into the closed position unless the ridges and grooves are properly registered and the catches engaged properly on the ridges.

FIGS. 24–29 show various views of the container with both slides 103 in the closed position. It is also possible to construct slide 103 without hole or recession 105, in which case its locking action of pressing against split projections 101 is similar to that of a wedge when the container is assembled.

When the container is constructed of a non-flexing material, slide 103, with or without hole or recession 105, may still be moved into locking position if the slide itself is constructed of a resilient compressible material.

When it is desired to expand the capacity of the container, an insert similar to insert 75 in FIGS. 11–14 may be used. This insert is a generally annular or ring shaped member with one half of the member offset from the plane of the other half of the member. For use with the slides, the member would be constructed with slots, ridges and projections as described above for the container sections. With expansion inserts, larger sizes of slides 103 must be used to hold the sections together with the inserts. For each additional insert, the height of the center section of slide 103 must be increased by the height of the insert wall, and another hole or recession 105 must be placed appropriately in line vertically with the hole/s or recession/s 105, at the correct distance to engage the adjacent split-projections 101 when the container is assembled.

To change one slide 103 for another of a different size, the slide 103 retained in the section in the open position is moved to wide slot 106 of its own section while the container is opened. The slide can then be easily removed through wide slot 106, and another slide inserted using the same method as in the original assembly of slide 103 into slot 99.

The expanded container is operated similarly to the container consisting of two sections. The above, however, is a fast, easy method for expanding the capacity of the unit without any sacrifice of its simple secure closure and other features.

The curvatures of the exterior surfaces of the container and the partial doming of the sections as shown in FIGS. 9, 10 and 33 prevents many of the stresses, caused by external blows to the container, from being transmitted to the contents of the container.

The structure of the space reducing insert 86, of a type shown in FIGS. 15 to 19, also prevents many stresses from blows or pressure against the outside of the container, from being transmitted to the contents because of the structure of this member. The inner configuration of this member follows the shape of the article being contained. In these drawings it is circular, as if accommodating a reel of motion picture film, or other round disc-like object. This spacer is made of a flexible material, such as medium density polyethylene. The arcuate shaped openings in the spacer ring allow the material to flex, give, and move considerably without exerting much pressure against the item contained, thereby in effect suspending the item within the container by absorbing blows and stresses through the spacer's own movement within the spacer's own defined space within the container. As the inner surface of this member presents to the article being contained, a continuous solid wall of considerable density, there is much less possibility of the member being cut by the ends of a sharp item in movement during a blow, such as a contained motion picture reel, than when a spongy type of shock-absorbing material is used. Moreover, the particular structure containing flexible walls with spaces between these walls, allows the member to absorb blows from the contained item's own inertial movement during a blow or shock without such force being transmitted significantly from the item to the container. In effect then, the member protects the contents by absorbing blows from without the container, and protects the container by absorbing blows from movement of the contents within.

When two or more items are enclosed in the container, a plastic disc having its thickest portion conforming to the location of the enclosed items' strongest portions may be used as a shock-absorbing unit. For example, the disc 91 portrayed in FIGS. 20 to 23 might be used to separate phonograph recordings, and to separate the recordings from the interior surfaces of the container. The thickest portion of the discs would be at the center unrecorded areas of the records. The plastic would be of a somewhat spongy compressible type so that pressures and shocks would be absorbed by the compression of the thick portions of the discs. To suspend the phonograph records from shock along the edges of the container, the discs 91 and phonograph records could all be placed within a shock absorbing ring 86, thereby isolating the phonograph records from external blows to the container from all directions. Contents' weaker parts are suspended by discs. If the items contained are two reels of motion picture film in a circular cavity 70, the shock-reducing insert 91 would be round, and would have its thick body 93 in the center. This would serve to keep the reels' flanges, which are the weaker and more flexible portions, from touching, by supporting the reels at their centers which are the strongest points. Thus, the flanges of one reel would be prevented from touching the flanges of the other reel, and would even be prevented from touching the shock-reducing insert itself. Thus, the film carried on the reels could not be damaged during transportation.

Although the interior hollow compartment or cavity 70 of the container is here shown as having a generally circular form with flat top and bottom, and the shock-reducing insert 91 as well as the capacity reducer 86 are also shown round, these might be of any shape, conforming to the shape of whatever article was to be shipped or stored in the container.

In each section of the container, there is a recess 64 with undercut groove 66 along the recesses' curved edges, as shown in FIG. 9. When the container is open, a card with information may be inserted from the edge of the section into the recess and the grooves. The curved surface of the container exerts pressure against the card and minimizes the card's movement. The card does not protrude above the surface of the container. When the container is closed, the two sections co-act in a manner whereby the edge of one section holds the card in place in the other section, as one edge has the recess whereas the mating edge does not. The edge without the recess blocks the card so that none of the card's edges can normally be undermined while the container is closed, and so that the card cannot be removed while the container is closed. The card can only be removed while the container is open.

It is preferred that the several parts of the container be constructed of durable, non-brittle, semi-flexible, almost rigid plastic material. Other materials may be used such as various plastics, metal, wood, a composition or combination of these materials. Economical mass production of this invention is possible through the use of processes such as injection molding. In shipping magnetic recording tapes, it is possible to metal-plate the interior of the container or to line it with magnetic material or metallic material to shield it from magnetic or electric fields.

While I have shown and described only a preferred embodiment of my invention by way of illustration, many modifications will occur to those skilled in the art and I therefore wish to have it understood that I intend in the appended claims to cover all such modifications as fall within the true spirit and scope of my invention, as well as the utilization of the features claimed, in devices other than containers.

Having thus described my invention, what I claim as new, and desire to secure by United States Letters Patent is:

1. A container, comprising a pair of opposed dished sections, said sections forming a central cavity portion, each of said sections having a generally flat body with a peripheral flange, said flange having an axially wide portion and an axially narrow portion, the wide and narrow flange portions of one section interfitting with the narrow and wide portions respectively of the other section, said axially wide portion having a bevelled elongated hook projecting therefrom and said axially narrow portion having an elongated slot therethrough, a ledge extending radially from the inner wall of said slot, said ledge of one section being engageable by said hook of the complementary section, each of said axially wide portions having an inwardly-facing arcuate groove along its inner surface, each of the axially narrow portions having an arcuate ridge projecting upwardly, said arcuate ridge of each section being releasably receivable within said arcuate groove of the complementary section, each of said sections having an elongated opening contiguous with a like elongated opening through the other section, the opening being in the area of the transition from said axially wide portion to said axially narrow portion, a projection extending radially from the inner surface of each opening in the axially wide portion and a third projection in the form of a half projection on each of said sections; an elongated moveable slide element receivable in the elongated openings of the mated sections, said slide element having a hole in its face capable of releasably receiving said third projection within said hole when said sections are mated to form said container through the receipt of said arcuate ridge in said arcuate groove; said slide element being lockingly engageable to hold said sections in releasingly united relation after the projections are held in position through the receipt of said arcuate ridge in said arcuate groove and the engagement of said bevelled hook and ledge of said sections.

2. A container as set forth in claim 1 including a removable flexible ring member within said central cavity portion; said ring member having arcuate shaped openings therein, said ring member serving to reduce the size of said cavity, and to absorb shocks transmitted to such cavity and from items within such cavity through the flexing of said ring member's structure, said ring member's inner wall's shape conforming to the configuration of the abutting surface of the contained items.

References Cited by the Examiner

UNITED STATES PATENTS 2,460,957   2/1949   Whitfield.

(Other references on following page)

UNITED STATES PATENTS

| | | | |
|---|---|---|---|
| 2,695,723 | 11/1954 | Waterman | 220—4 |
| 2,899,097 | 8/1959 | Haskins | 220—60 |
| 3,003,622 | 10/1961 | Hardigg | 220—15 |

FOREIGN PATENTS

| | | |
|---|---|---|
| 916,846 | 12/1946 | France. |
| 786,197 | 11/1957 | Great Britain. |

THERON E. CONDON, *Primary Examiner.*

GEORGE O. RALSTON, LOUIS G. MANCENE, *Examiners.*

GEORGE E. LOWRANCE, *Assistant Examiner.*